June 13, 1944.       J. G. HAWLEY       2,351,041
BRAKE
Filed Sept. 3, 1940       2 Sheets-Sheet 1

Inventor
Jesse G. Hawley,
By Albert T. St Clair
Attorney

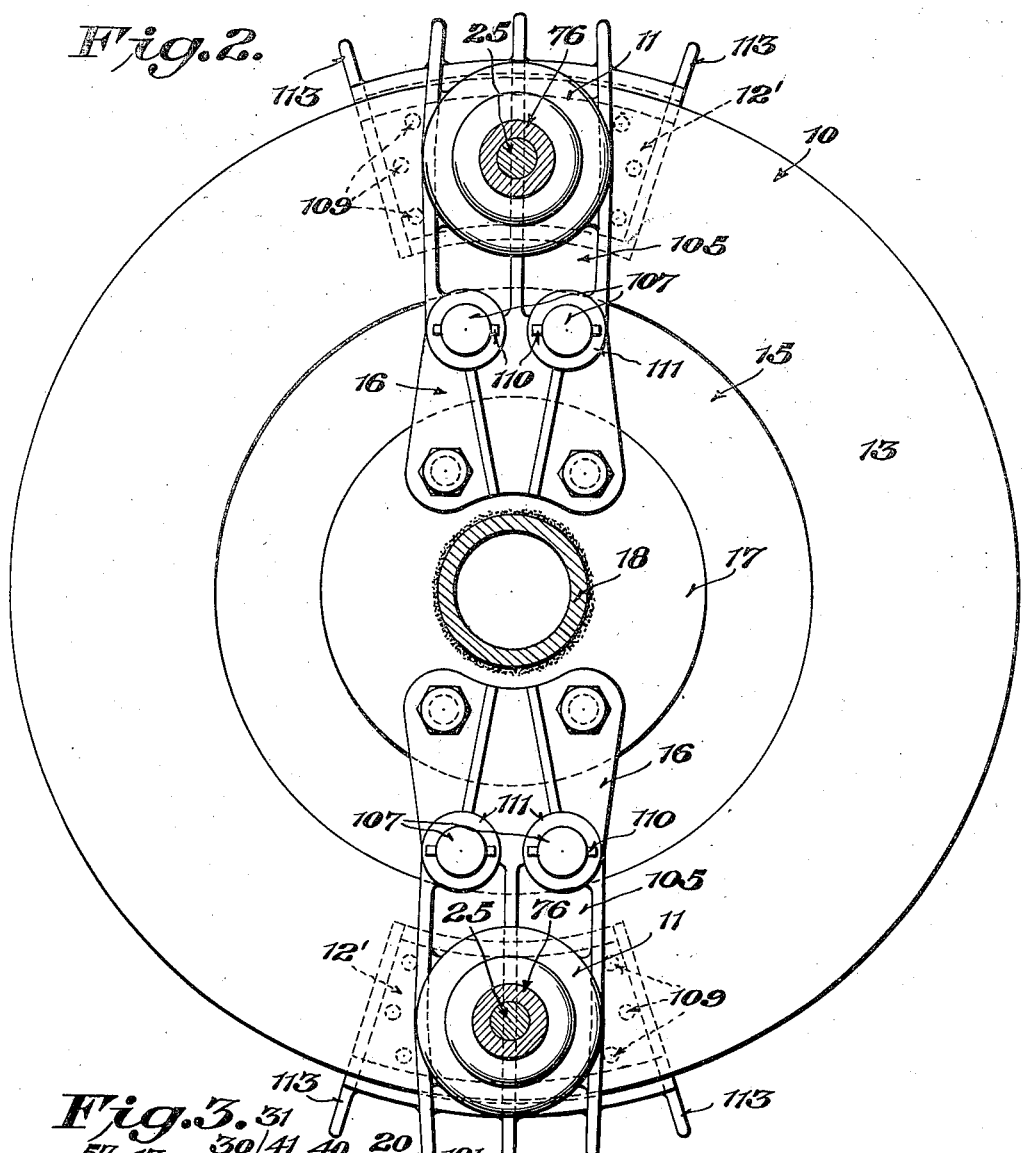

Patented June 13, 1944

2,351,041

UNITED STATES PATENT OFFICE 2,351,041

BRAKE

Jesse G. Hawley, Painted Post, N. Y.

Application September 3, 1940, Serial No. 355,263

5 Claims. (Cl. 188—152)

This invention relates to the art of brakes, and more particularly to a hydraulic brake which is especially useful for airplanes.

Most airplane brakes which have heretofore been developed have been cumbersome and heavy, or have been of complicated construction.

I have found that these disadvantages can be overcome, and a highly effective brake, particularly useful for airplanes, can be produced by the construction disclosed herein.

It is therefore an object of this invention to provide a new and improved brake.

It is another object to provide a hydraulic airplane brake.

It is a further object to provide a light hydraulic brake which will deliver any desired braking pressure.

With the above and other objects in view, which will be apparent as the description proceeds, I have set forth my invention in the following specification and have illustrated it in the accompanying drawings, in which:

Fig. 2 is a vertical transverse section, on an enlarged scale, on the line 2—2 of Fig. 1; and Fig. 3 is a vertical longitudinal section through the upper power unit brake shown in Figs. 1 and 2.

Figure 1:
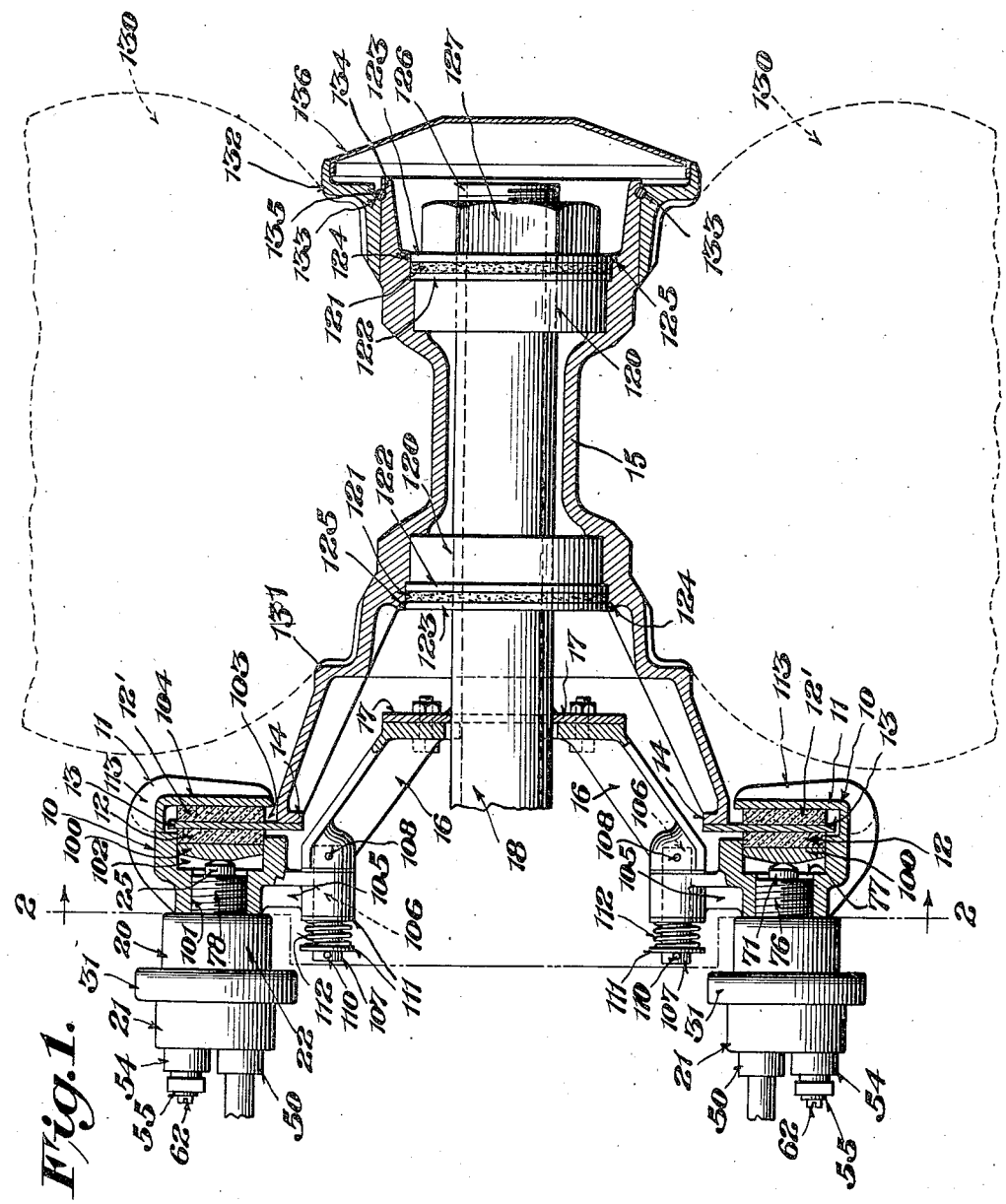
Figure 1 is a vertical lonigtudinal section showing my new brakes applied to an airplane wheel.

Referring to the accompanying drawings, and more particularly to Fig. 1 thereof, my new brake 10 comprises one or more power units 20, which will be described in detail hereinafter, one or more brake clamps 11, provided with brake lining 12, 12', and a braking disc 13. The latter is preferably a circular disc that is screwed or riveted to a flange 14 on wheel hub 15. Power units 20 are preferably carried, as described hereinafter, by a bracket 16 which is bolted to a flange 17 welded, or otherwise secured, to the axle 18.

The operating mechanism for my new brake comprises one or more of the power units 20, which are preferably of the type disclosed and claimed in my co-pending application Serial No. 337,102, filed May 24, 1940. This preferably comprises a fluid cylinder 21, a piston cylinder 22, a resilient seal 23, a piston 24, and a piston rod 25.

As best shown in Fig. 3, fluid cylinder 21 and piston cylinder 22 are cup-shaped members terminating in circumferential flanges 26 and 27, respectively, between which a flange 28 on the resilient seal 23 and a spacer ring 30 are securely held by a clamping ring 31, which is securely clamped therearound by any convenient means, as a power press (not shown).

Resilient seal 23 is preformed and is resistant to oils. It is made of any suitable material, such as neoprene, buna rubber, or thiokol. As shown, it comprises a bottom portion 32 which is flat, side wall 33 at right angles thereto, and the aforementioned flange 28 which extends at right angles to the side wall 33 and terminates in a secondary flange 34 that is parallel to the side wall 33 but spaced therefrom.

The piston 24 comprises a head 35 and a circumferential flange 36 at right angles thereto. The head 35 and flange 36 are made just sufficiently smaller than the resilient seal 23 to permit the piston 24 to be inserted in the resilient seal without deforming it, and the internal diameter of the spacer ring 30 is only sufficiently larger than the diameter of the piston 24 to permit its moving freely therethrough.

Piston cylinder 22 comprises a bottom portion 37, which is flat but is provided with an orifice 38, for a purpose to be described later, and a side wall 40, whose internal diameter is equal to the internal diameter of the side wall 33 of resilient seal 23, and which is only sufficiently larger than the external diameter of the flange 36 on piston 24 to permit it to move freely therethrough. Side wall 40 terminates in the flange 27 described above, and this, in turn, is provided with a right angular extension 41, which is parallel to the side wall 40 and of a suitable internal diameter such that it just accommodates spacer ring 30 and flange 34 of resilient seal 23.

Fuild cylinder 21 comprises a bottom portion 42 provided with a side wall 43 that is of just sufficient internal diameter to allow the side wall 33 of resilient seal 23 to fit therein without deformation. Side wall 43 terminates in flange 26 discussed above.

Bottom portion 42 is provided with two bosses 50, 54 that are preferably formed integral therewith. Boss 50 is internally threaded at 51 to receive any suitable coupling (not shown), and is provided with an orifice 52 to permit fluid (not shown) to enter a chamber 53 formed in fluid cylinder 21 between its bottom portion 42 and the resilient seal 23. Boss 54 is preferably internally threaded to receive a correspondingly threaded bleeder plug 55, provided with a square head 56. Bleeder plug 55 communicates with the exterior through a longitudinal orifice (not shown) that communicates with a transverse orifice 57, in a shank 58 of reduced diameter, Orifice 57 can communicate with a transverse orifice 60 in bottom portion 42 of fluid cylinder 21, and thence with the chamber 53 when the bleeder plug 55 is partially unscrewed from its seat 61. This may conveniently be done with a screw driver by inserting the latter in a transverse slot 62 in the head of the bleeder plug 55.

Piston rod 25 is provided with a flat head 70 and a tapered end 71. Piston rod 25 operates in, and is guided by, a power head 76 that has a longitudinal aperture 77 of just sufficiently larger internal diameter than piston rod 25 to allow the latter to move therein without undue friction. Power head 76 is preferably a screw machine part that is externally threaded at 78.

The travel of piston rod 25 is preferably controlled by a spacer 84, provided with an external flange 85, whose external diameter corresponds to the internal diameter of the side wall 40 of piston cylinder 22, and with an orifice 86 that is of large enough diameter to permit the piston rod 25 to move therethrough without undue friction. A spacer sleeve 87, that is of sufficiently smaller external diameter to fit snugly in spacer 84, and of larger internal diameter than the orifice 86, is designed to retain a stop pin 88, carried by the piston rod 25 but projecting therebeyond, so as to limit the travel of the piston rod 25 between the spacer 84 and the inner end of power head 76. Spacer sleeve 87 is preferably separate from the threaded portion 78 of power head 76. Spacer 84 is also internally threaded to engage the inner threaded end 78 of power head 76.

A heavy coil spring 90 is telescoped around spacer 84, and bears against the flange 85 thereof and against the head 70 of piston rod 25, to normally force the latter into engagement with piston 24 and cause that to bear against resilient bottom portion 32 of resilient seal 23, but spring 90 is of insufficient power to stretch the resilient seal. The latter is free of either compression or distention when it is in normal position.

With the construction described, when it is desired to apply the brake, the operator supplies actuating fluid to the power unit 20 by moving a lever or pressing a button (not shown) which causes fluid from any suitable outside source (not shown) to enter chamber 53 in fluid cylinder 21, through the orifice 52 and bear against the exposed portion 32 of resilient seal 23. This moves piston 24 and piston rod 25 forward against the pressure of spring 90 and forces the tapered end 71 of piston rod 25 outwardly into contact with a pressure block 100 which is interposed between the piston rod and the innermost brake lining 12, thus forcing the latter into contact with the braking disc 13. This action simultaneously pulls the outer brake lining 12', carried by the outer portion of the brake clamp 11, into contact with the opposite side of the braking disc 13 to complete the brake application.

As best shown in Fig. 3, brake clamps 11 each have a threaded longitudinal recess 101 to cooperate with the threads 78 on power head 76 and an enlarged recess 102 to receive and guide the pressure block 100 and brake lining 12. They are also provided with an entrance slot 103 (Fig. 1) to accommodate the braking disc 13 and brake lining 12'. The latter is secured to the outer end 104 of the clamp in any desired way, as by rivets 109 (Fig. 2).

Each clamp 11 is also provided with an arm 105 that is apertured at 106 to receive a stud 107. The latter is provided with a transverse orifice to receive a pin 108 by which it is detachably secured to the bracket 16. At its opposite end, stud 107 is provided with a cross pin 110 to retain a pair of washers 111 and a spring 112 which are adapted to give the clamp a slight yielding movement during the braking action. Each clamp 11 is provided with a plurality of reinforcing ribs 113.

As shown in Fig. 1, the axle 18 is supported in the wheel hub 15 by a pair of Timken bearings 120, each of which is retained in position by a washer assembly comprising a felt washer 121 protected by metal washers 122 and 123 and a spring retaining ring 124 which is received in a recess 125 in the wheel hub 15.

At its outer end, axle 18 is provided with threads 126 to receive a retaining nut 127.

A tire 130 is mounted on the wheel hub 15 and is retained thereon between flange 131 on the inner side of the hub and a retaining flange 132 on the outer side of the hub. The latter is retained in position by a spring retaining ring 133 which is received in registering recesses 134 and 135 in the wheel hub 15 and retaining flange 132, respectively.

A light metal hub cap 136 is spring held in the retaining flange 132 to prevent the entrance of dirt and moisture.

The parts of my brake construction and related mechanism may be made of any desired materials. In general, however, I prefer to make the braking disc of chromium plated carbon steel or stainless steel. For airplane use, the wheel hub is preferably of light weight material, such as aluminum or magnesium alloys of the Dow Metal type. The clamp is also preferably made of Dow Metal or Lynite. The brake lining may be of any desired material, such as the conventional asbestos brake lining, or of leather. The latter has been found to be particularly satisfactory.

While I have only shown two or my improved power units and related brake mechanisms in Fig. 1, it will be understood that I may use one or any desired number of these power unit clamp brakes, and, by increasing the number, or by using units of larger diameter, and by regulating the amount of operating fluid supplied to them, any desired braking pressure can be obtained. Furthermore, by a proper distribution of the power unit brakes around the periphery of the circular disc, a substantially equal pressure may be exerted around its entire periphery, and, by the use of proper springs 112, the braking thrust can be properly balanced. Also, in view of the simple construction of the parts shown, any broken or damaged unit may easily be replaced and a new unit substituted without disassembling the wheel or the tire.

It will therefore be apparent that I have developed a new and useful brake which is capable of general application, but which is particularly adapted for airplane use. It is a particular point of my invention that my new brake construction departs from conventional types and uses one or more relatively small clamp brakes, which have braking surfaces of relatively small area, including my improved power units. The latter may be operated simultaneously by the use of a master cylinder, although this has not been shown in the drawings, since it forms no part of the present invention.

As many apparently widely different embodiments of this invention may be made without departing from the spirit thereof, it is understood that I do not limit myself to the foregoing embodiments or description except as indicated in the following claims:

I claim:

1. A brake, comprising a fixed support, an open-jawed clamp of less than annular extent carried thereby, a friction imparting member loosely supported therein, an annular disc rotatable through the open jaw of the clamp, and a sealed hydraulic power unit for forcing the friction imparting member against the rotatable disc, the clamp and power unit being detachably connected to the fixed support through a spring-pressed stud and being removable from the fixed support without removing any other parts.

2. A brake, comprising a fixed support, a removable open-jawed clamp carried thereby, a friction imparting member loosely supported therein, a disc rotatable through the open jaw of the clamp, and a hydraulic power unit for forcing the friction imparting member against the rotatable disc, the clamp being yieldingly mounted on the fixed support and the rotatable disc being carried by a wheel hub.

3. In a brake construction, the combination of a wheel hub, an annular rotatable disc carried thereby, a fixed axle, and a brake arranged in cooperative relation thereto and supported thereby, the brake comprising an open-jawed clamp of less than annular extent through which the disc is movable, a friction imparting member carried by the clamp adjacent to the surface of the disc, and a sealed power unit for forcing the friction imparting member against the disc, the clamp and power unit being detachably connected to the fixed axle through a spring-pressed stud and being removable from its support without removing any other parts.

4. An airplane brake, comprising a continuous circular disc carried by a wheel hub, a fixed support, a plurality of open-jawed clamps carried thereby and through which the disc is successively movable, a pair of braking discs carried by each clamp, one of which discs is adjacent to each surface of the circular disc, and a sealed power unit carried by each clamp for forcing the braking discs into contact with the circular disc, each clamp and its power unit constituting a unitary member which is removable from the fixed support independently without disturbing the others.

5. A brake assembly, comprising a clamp, a rotary member for engagement with the clamp, and a sealed removable power unit for actuating the clamp, said power unit having a fluid cylinder, a piston cylinder, a cup-shaped resilient seal interposed between these two cylinders, a fluid inlet port, and means for sealing said power unit against the entrance of any substance except through said fluid inlet port.

JESSE G. HAWLEY.